Figure 1:
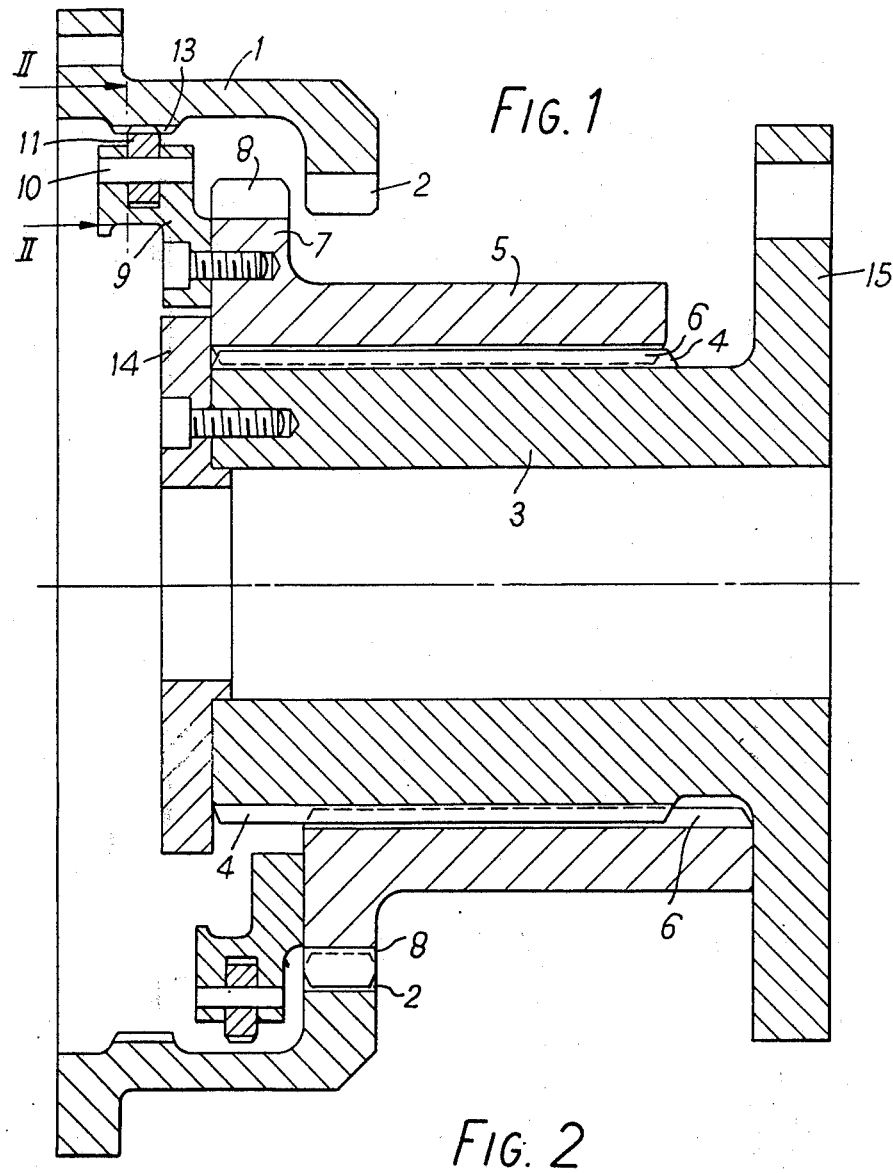

United States Patent [19]

Clements

[11] 3,952,460
[45] Apr. 27, 1976

[54] METHOD OF MANUFACTURE OF TOOTHED CLUTCHES

[75] Inventor: Herbert Arthur Clements, Weybridge, England

[73] Assignee: S.S.S. Patents Limited, London, England

[22] Filed: Aug. 5, 1974

[21] Appl. No.: 494,869

[30] Foreign Application Priority Data
Aug. 28, 1973  United Kingdom............... 40420/73

[52] U.S. Cl..................................... 51/323; 29/404
[51] Int. Cl.².......................................... B24B 1/00
[58] Field of Search.................. 51/281 R, 287, 323, 51/324; 29/404, DIG. 19; 269/12

[56] References Cited
UNITED STATES PATENTS

| | | | |
|---|---|---|---|
| 2,044,818 | 6/1936 | Spase............................. | 269/12 X |
| 2,949,057 | 8/1960 | Polidor........................... | 269/12 X |
| 3,740,904 | 6/1973 | Ainoura.......................... | 51/287 |
| 3,786,601 | 1/1974 | Seidensticker................... | 51/287 X |

Primary Examiner—Al Lawrence Smith
Assistant Examiner—Nicholas P. Godici
Attorney, Agent, or Firm—Woodcock Washburn Kurtz & Mackiewicz

[57] ABSTRACT

Manufacture of a toothed clutch of the type comprising a first rotary clutch part provided with clutch teeth, a second rotary clutch part and an intermediate member provided with clutch teeth and movable relative to the second clutch part via interengaged splines to bring the coacting clutch teeth into and out of interengagement. The invention includes the step of grinding the clutch teeth of the intermediate member, or of grinding a datum diameter for use in subsequent grinding of the clutch teeth of the intermediate member, or of balancing or checking the balance of the intermediate member and the second rotary clutch part, whilst torque is present between the intermediate member and the second rotary clutch part whereby to simulate at least partly the torque conditions that exist between them when the clutch is transmitting torque. The invention also includes apparatus for use in the method.

2 Claims, 3 Drawing Figures

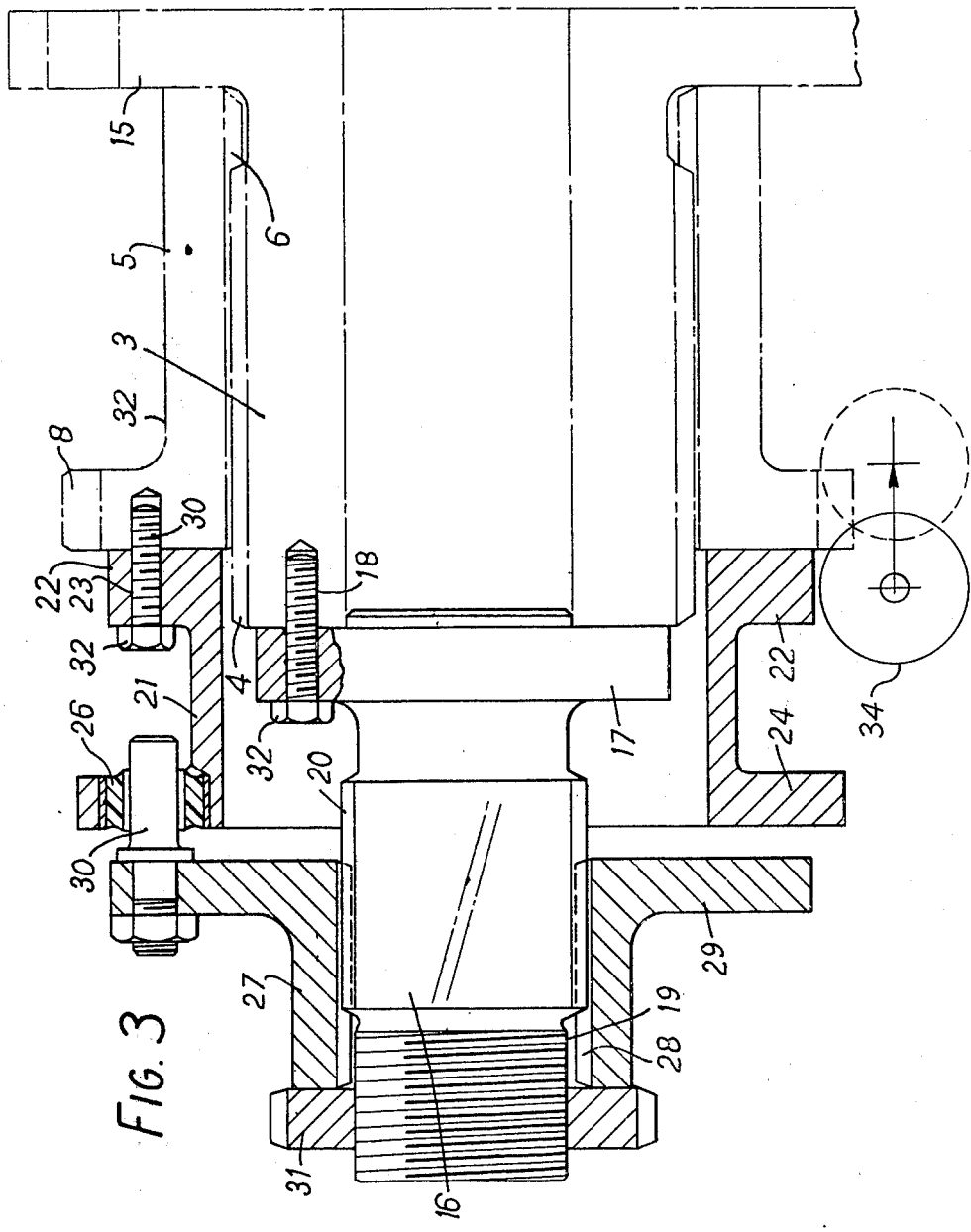

METHOD OF MANUFACTURE OF TOOTHED CLUTCHES

This invention relates to the manufacture of toothed clutches of the general type comprising a first rotary clutch part which is provided with clutch teeth, a secondary rotary clutch part, and an intermediate member which is provided with clutch teeth and which is slidably connected to said second rotary clutch part via interengaged splines so as to be capable of movement relative to the said second rotary clutch part to bring the coacting clutch teeth into and out of interengagement. The invention relates particularly but not exclusively to the manufacture of synchronous self-shifting toothed cluthes of the known type wherein the interengaged splines of the intermediate member and of the second rotary clutch part are helical, and wherein pawl and ratchet mechanism or equivalent mechanism is provided whereby upon relative rotation of said first and second rotary clutch parts in one direction the pawls ratchet relative to the ratchet teeth, whereas upon relative rotation of the first and second rotary clutch parts in the other direction the pawls engage ratchet teeth and the intermediate member is shifted helically relative to the said second rotary clutch member to bring the coacting clutch teeth into at least partial interengagement.

Figure 2:
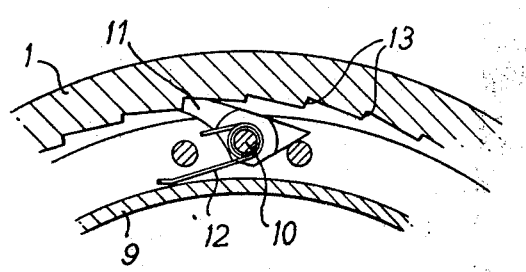

FIG. 1 of the accompanying drawings is a view in sectional elevation on the axis of a synchronous self-shifting toothed clutch of known type incorporating pawl and ratchet mechanism, the upper half of the Figure showing the clutch in the disengaged condition and the lower half of the Figure showing the clutch in the engaged condition, and FIG. 2 is a section on the line II—II of FIG. 1.

FIG. 3 is a view in sectional elevation of an example of apparatus in accordance with the invention in use including the second rotary clutch part.

The synchronous self-shifting toothed clutch shown in FIGS. 1 and 2 includes a first rotary clutch part 1 which carries a ring of internal clutch teeth 2, a second rotary clutch part 3 formed with external helical splines 4, and an intermediate member 5 which is formed with internal helical splines 6 engaged with the external helical splines 4 on the second rotary clutch part 3. The intermediate member 5 has a flange 7 formed with a ring of external clutch teeth 8. The first rotary clutch part 1 is formed with a ring of internal ratchet teeth 13. To the left-hand end of the intermediate member 5 is bolted an annular pawl carrier 9 which is formed with an annular groove across which extend pawl pins, one of which is shown at 10, on which are pivotally mounted pawls 11 provided with control springs 12. To the left-hand end of the second rotary clutch part 3 is bolted a ring 14 which projects radially outwardly beyond the second rotary clutch part 3 and constitutes an axial stop for the intermediate member 5. A further axial stop for the intermediate member 5 is constituted by a radially outwardly projecting flange 15 at the right-hand end of the second rotary clutch part 3.

In the disengaged condition of the clutch, shown in the upper half of FIG. 1, the clutch teeth 8 carried by the intermediate member 5 are to the left of the clutch teeth 2 carried by the first rotary clutch part 1, and the pawls 11 are positioned for ratcheting relative to the ratchet teeth 13 during relative rotation of the first and second rotary clutch parts 1 and 3 in one direction. The intermediate member 5 is against the axial stop 14. Upon relative rotation of the first and second rotary clutch parts 1 and 3 in the other direction, pawls 11 engage ratchet teeth 13, with the effect that the intermediate member 5 is shifted helically to the right relative to the second rotary clutch member 3 so as to bring the clutch teeth 8 into precise partial interengagement with the clutch teeth 2. Thereupon the interaction of the partially interengaged clutch teeth 2 and 8 in conjunction with the action of the interengaged helical splines 4 and 6 causes the intermediate diameter member to shift further to the right, still helically relative to the second rotary clutch part 3, to bring its clutch teeth 8 into full interengagement with the clutch teeth 2. The intermediate member 5 is then against the axial stop 15, and the pawls 11 are located to the right of the ratchet teeth 13, as shown in the lower half of FIG. 1.

When the relative rotation of the first and second rotary clutch parts 1 and 3 again reverses, the interaction of the clutch teeth 2 and 8 and of the helical splines 4 and 6 causes the intermediate member 5 to shift to the left, bringing the clutch teeth 8 out of engagement with the clutch teeth 2 and bringing the pawls 11 back into ratcheting relationship with the ratchet teeth 13, with the intermediate member 5 against the axial stop 14 as shown in the upper half of FIG. 1.

When the clutch is engaged (lower half of FIG. 1) and is transmitting torque the interaction of the coacting surfaces of the helical splines 4 and 6 and of the clutch teeth 2 and 8 has a centering effect such that the first and second rotary clutch parts 1 and 3 and their associated shafts tend to be supported by one another in the vicinity of the clutch teeth 2 and 8. If, owing to inaccuracies in the said coacting surfaces of the splines 4 and 6 and/or of the clutch teeth 2 and 8 the coacting rings of clutch teeth 2 and 8 are eccentric relative to one another, the first and second rotary clutch parts 1 and 3 will not be mutually supported concentrically, with the result that at least one of these rotary clutch parts will exhibit eccentricity relative to the clutch axis such that unbalance forces will act when the clutch and the associated shafts are in rotation. A further cause of eccentricity may be inaccuracies in the abutting surfaces of the intermediate member 5 and of the axial stop 15.

It is not, in general, satisfactory to balance the intermediate member 5 and the second rotary clutch part 3 when no torque is present between them, sine the balance may be affected by relative radial movements permitted by the clearances between the helical splines 4 and 6.

The object of the invention is to overcome or reduce these problems, and in accordance with the invention there is provided a method of manufacturing a toothed clutch of the general type first referred to herein, the said method including the step of grinding the working surfaces of the clutch teeth of the intermediate member, or grinding a datum diameter for use in subsequent grinding of the said working surfaces, and/or balancing or checking the balance of the intermediate member and the second rotary clutch part, whilst torque is present between the intermediate member and the second rotary clutch part.

Further in accordance with the invention there is provided apparatus for use in performing the method according to the invention, the apparatus comprising a first part to be firmly secured to the second rotary clutch part, a second part to be firmly secured to the intermediate member whilst its splines are interengaged with the splines of the second rotary clutch part, and means for creating and maintaining torque between said first and second parts of the apparatus whereby to create and maintain torque between the intermediate member and the second rotary clutch part.

FIG. 3 of the accompanying drawings is a view in sectional elevation of an example of apparatus in accordance with the invention, as employed in the manufacture of the synchronous self-shifting toothed clutch described with reference to FIGS. 1 and 2. FIG. 3 also shows in dot-dash lines the second rotary clutch part 3 of the clutch shown in FIGS. 1 and 2, without the ring 14, and the intermediate member 5 without the pawl carrier 9.

The apparatus shown in FIG. 3 includes a substantially cylindrical first part 16 formed at its right-hand end with a radially outwardly projecting annular flange 17 in which is provided a ring of holes one of which is shown at 18. The said first part 16 is formed at its left-hand end with a screwthread 19, and between the screwthread 19 and the flange 17 the first part 16 is formed with helical splines 20 of the same hand as the helical splines 4 and 6 of the second rotary clutch part 3 and the intermediate member 5. The apparatus includes a second part which comprises a sleeve 21 of larger internal diameter than the external diameter of the second rotary clutch part 3. At its right-hand end the sleeve 21 is formed with a radially outwardly projecting annular flange 22 in which is formed a ring of holes one of which is shown at 23. At its left-hand end the sleeve 21 is formed with a radially outwardly projecting annular flange 24 which is formed with a ring or holes in each of which is accommodated a bush 26 of resilient material, e.g. rubber. The second part of the apparatus also comprises a sleeve 27 formed with internal helical splines 28 engageable with the helical splines 20 of the part 16, and formed with a radially outwardly projecting annular flange 29 to which is bolted a ring of dowels 30 which project towards the right-hand end of the part 16. The number and spacing of the dowels 30 are the same as the number and spacing of the resilient bushes 26. The apparatus also includes a nut 31 which can be screwed on to the screwthread 19.

When the apparatus is to be used, the intermediate member 5 of the clutch (without the pawl carrier 9) and the second rotary clutch part 3 (without the ring 14) are fitted together with the helical splines 4 and 6 interengaged, and the intermediate member 5 is slid along the second rotary clutch part 3 until the intermediate member is against the axial stop 15, so that the second rotary clutch part 3 and the intermediate member 5 have the relative positions shown in FIG. 3, corresponding to the engaged condition of the clutch. The part 16 is firmly secured to the second rotary clutch part 3 by means of bolts 32, using the tapped holes 18 in the second rotary clutch part which will subsequently be used for securing the ring 14 to the second rotary clutch part. The sleeve 27 and the sleeve 21 are then connected to one another by passing the dowels 30 through the respectve resilient bushes 26, and the sleeve 27 is applied to the part 16 with the helical splines 20 and 28 interengaged, and is slid along the part 16 until the holes 23 register with the tapped holes 30 in the intermediate member 5 which will subsequently be used for bolting the pawl carrier 9 to the intermediate member. The sleeve 21 is then firmly secured to the intermediate member 5 by means of bolts 32 passed through the holes 23 and into the tapped holes 30 in the intermediate member. The nut 31 is then applied to the screwthread 19.

The parts of the apparatus now have the positions, relative to one another and to the intermediate member 5 and second rotary clutch part 3, shown in FIG. 3.

The nut 31 is then tightened, with the effect that the sleeve 27 is shifted to the right relative to the part 16, along the splines 20 and 28. Since these splines are helical, the sleeve 27 rotates relative to the part 16, but such that through the intermediary of the dowels 30, the resilient bushes 26 and the sleeve 21 the intermediate member 5 tends to be rotated relative to the second rotary clutch part 3, such rotation however being resisted owing to the action of the helical splines 4 and 6 interconnecting the second rotary clutch part 3 and the intermediate member 5, and owing to the abutting engagement of the intermediate member 5 with the axial stop 15. The effect of tightening the nut 31 is therefore to apply torque between the intermediate member 5 and the second rotary clutch part 3, with pressure between the helical splines 6 of the intermediate member 5 and the helical splines 4 of the second rotary clutch part 3, such as to simulate at least partly the torque conditions that will exist between the intermediate member 5 and the second rotary clutch part 3 when the clutch is engaged and is transmitting torque. The effect of the resilient bushes 26 is to permit the torque to be applied between the intermediate member 5 and the second rotary clutch part 3 without affecting their relative radial positions.

The apparatus, carrying the second rotary clutch part 3 and the intermediate member 5 in the mutual condition that has been created, is then transferred to a grinding machine which is provided with a grinding wheel such as that depicted at 34 of FIG. 3. This machine may be used to grind the working surfaces of the clutch teeth 8 of the intermediate member 5, or if preferred one or more datum diameters may be ground on the intermediate member 5 for use as an accurate datum in the subsequent grinding of the said working surfaces. Such a datum diameter may for example be ground on the outer surface 32 of the intermediate member 5 adjacent the clutch teeth 8.

Additionally, or alternatively, the apparatus carrying the second rotary clutch part 3 and the intermediate member 5 maintained in the mutual torque condition that has been created may be applied to a balancing machine for checking and if necessary correcting the balance of the assembly.

I claim:

1. A method of manufacturing a toothed clutch of the type comprising a first rotary clutch part provided with clutch teeth, a second rotary clutch part, and an intermediate member which is provided with clutch teeth and is slidably connected to said second rotary clutch part via interengaged splines so as to be capable of movement relative to said second rotary clutch part to bring the clutch teeth of said intermediate member into and out of interengagement with the clutch teeth of said first rotary clutch part, the improvement including the steps of assembling together said intermediate member and said second rotary clutch part in the relative positions that they will eventually assume when the clutch is fully engaged and thereupon creating torque between said intermediate member and said second rotary clutch part to simulate in at least some degree the torque condition that will eventually exist between said intermediate member and said second rotary clutch part when the clutch is transmitting torque, and grinding the working surfaces of the clutch teeth of said intermediate member whilst such created torque condition is present between said intermediate member and said second rotary clutch part.

2. A method of manufacturing a toothed clutch of the type comprising a first rotary clutch part provided with clutch teeth, a second rotary clutch part, and an intermediate member which is provided with clutch teeth and which is slidably connected to said rotary clutch part via interengaged splines so as to be capable of movement relative to said second rotary clutch part to being the clutch teeth of said intermediate member into and out of interengagement with the clutch teeth of said first rotary clutch part, the improvement including the steps of assembling together said intermediate member and said second rotary clutch part in the relative position that they will eventually assume when the clutch is fully engaged and thereupon creating torque between said intermediate member least said second rotary clutch part to simulate in at leat some degree the torque condition that will eventually exist between said intermediate member and said second rotary clutch part when the clutch is transmitting torque, and grinding on said intermediate member a datum diameter, for use in subsequent grinding of the working surfaces of the clutch teeth of said intermediate member, whilst such created torque condition is present between said intermediate member and said second rotary clutch part.

* * * * *